(12) United States Patent
Simi

(10) Patent No.: US 8,384,295 B2
(45) Date of Patent: Feb. 26, 2013

(54) BALLAST CIRCUIT FOR LED-BASED LAMP INCLUDING POWER FACTOR CORRECTION WITH PROTECTIVE ISOLATION

(75) Inventor: Victor M. Simi, Lexington, KY (US)

(73) Assignee: OSRAM SYLVANIA Inc., Danvers, MA (US)

( * ) Notice: Subject to any disclaimer, the term of this patent is extended or adjusted under 35 U.S.C. 154(b) by 436 days.

(21) Appl. No.: 12/616,301

(22) Filed: Nov. 11, 2009

(65) Prior Publication Data
US 2011/0109230 A1    May 12, 2011

(51) Int. Cl.
*H05B 37/02* (2006.01)
(52) U.S. Cl. ......... 315/219; 315/247; 315/276; 315/299
(58) Field of Classification Search .............. 315/209 R, 315/219, 224, 247, 276, 291, 299
See application file for complete search history.

(56) References Cited

U.S. PATENT DOCUMENTS

| | | | |
|---|---|---|---|
| 7,505,287 B1 * | 3/2009 | Kesterson ................ | 363/21.01 |
| 7,561,452 B2 | 7/2009 | Mednik et al. | |
| 7,658,510 B2 * | 2/2010 | Russell ................... | 362/249.02 |
| 7,755,915 B2 * | 7/2010 | Yan et al. ................. | 363/21.16 |
| 7,830,677 B2 * | 11/2010 | Chou ....................... | 363/21.12 |
| 2006/0132061 A1 | 6/2006 | McCormick et al. | |
| 2007/0267984 A1 | 11/2007 | Peng | |
| 2008/0278092 A1 | 11/2008 | Lys et al. | |
| 2011/0012530 A1 * | 1/2011 | Zheng et al. ............... | 315/294 |

FOREIGN PATENT DOCUMENTS
WO       2009/001279 A1    12/2008

OTHER PUBLICATIONS

Ian Morrish, International Search Report and Written Opinion of the International Searching Authority, Jan. 24, 2011, pp. 1-9, European Patent Office, Rijswijk, The Netherlands.
C. Adranga & G. Gattavari, Flyback Converters With the L6561 PFC Controller, AN1060 Application Note, Jan. 2003, pp. 1-11, STMicroelectronics.
Claudio Adragna, Design Equations of High-Power-Factor Flyback Conversion Based on the L6561, AN1059 Application Note, Sep. 2003, pp. 1-20, STMicroelectronics.
Luca Salati, Switching From the L6561 to the L6562, AN1757 Application Note, Apr. 2004, pp. 1-9, STMicroelectronics.

* cited by examiner

*Primary Examiner* — Thuy Vinh Tran
(74) *Attorney, Agent, or Firm* — Shaun P. Montana

(57) ABSTRACT

A ballast circuit for a light emitting diode (LED) based lamp including power factor correction with protective isolation. The circuit includes a transformer with electrically isolated windings and a power factor correction circuit that receives no feedback from a secondary winding side of the transformer. An LED-based lamp assembly and a method of driving an LED-based light source are also provided.

16 Claims, 4 Drawing Sheets

BALLAST CIRCUIT FOR LED-BASED LAMP INCLUDING POWER FACTOR CORRECTION WITH PROTECTIVE ISOLATION

TECHNICAL FIELD

The present application relates to a ballast circuit for a light emitting diode (LED)-based lamp including power factor correction with protective isolation.

BACKGROUND

The development of high-brightness LEDs has led to use of such devices in various lighting fixtures. In general, an LED-based lamp operates in a fundamentally different way than an incandescent, or gas discharge lamp, and therefore may not be connectable to existing lighting fixtures designed for those types of lamps. A ballast circuit may be used, however, to allow use of an LED-based lamp as a retro-fit for existing lighting fixtures.

The ballast circuitry for an LED-based lamp generally converts an alternating current (AC) input, such as a 120V/60 Hz line input or input from a dimmer switch, to a stable direct current (DC) voltage used for driving the LED-based lamp. Such circuitry may incorporate a rectifier for receiving the AC input and a DC-DC converter circuit. The DC-DC converter circuit may receive an unregulated DC output from the rectifier and provide a stable, regulated DC output to the LED-based lamp.

A variety of DC-DC converter configurations are well-known in the art. Certain types of known DC-DC converter configurations, such as buck converters, boost converters, buck-boost converters, etc., are generally categorized as switching regulators. These devices include a switch, e.g. a transistor, which is selectively operated to allow energy to be stored in an energy storage device, e.g. an inductor, and then transferred to one or more filter capacitors. The filter capacitor(s) provide a relatively smooth DC output voltage to the load and provide essentially continuous energy to the load between energy storage cycles.

One issue with such switching regulator configurations is that there may be no protective isolation between the unregulated DC voltage and the regulated DC output voltage. In some configurations, the unregulated DC voltage may be 400 Volts or more. The unregulated DC voltage can be dangerous if inadvertently applied to the load.

To provide protective isolation, therefore, a transformer-based switching regulator, such as a known "flyback" converter, may be used. In a transformer-based switching regulator, the primary side of the transformer may be coupled to the unregulated DC voltage. The regulated DC output voltage is provided at the secondary side of the transformer, which is electrically isolated from the primary side of the transformer. The transformer may thus provide protective isolation of the DC output from the unregulated DC voltage.

Another issue with switching regulator configurations is that they involve a pulsed current draw from the AC power source in a manner that results in less than optimum power factor. The power factor of a system is defined as the ratio of the real power flowing to the load to the apparent power, and is a number between 0 and 1 (or expressed as a percentage, e.g. 0.5 pf=50% pf). Real power is the actual power drawn by the load. Apparent power is the product of the current and voltage applied to the load.

For systems with purely resistive loads, the voltage and current waveforms are in phase, changing polarity at the same instant in each cycle. Such systems have a power factor of 1.0, which is referred to as "unity power factor." Where reactive loads are present, such as with loads including capacitors, inductors, or transformers, energy storage in the load results in a time difference between the current and voltage waveforms. This stored energy returns to the source and is not available to do work at the load. Systems with reactive loads often have less than unity power factor. A circuit with a low power factor will use higher currents to transfer a given quantity of real power than a circuit with a high power factor.

To provide improved power factor, some lamp ballast circuit configurations are provided with a power factor correction circuit. The power factor correction circuit may be used, for example, as a controller for controlling operation of the transistor switch in a DC-DC converter configuration such as a "flyback" converter. In such a configuration, a power factor controller may monitor the rectified AC voltage, the current drawn by the load, and the output voltage to the load, and provide an output control signal to the transistor to switch current to the load having a waveform that substantially matches and is in phase with the rectified AC voltage.

SUMMARY

In conventional lamp ballast configurations including a transformer-based switching regulator and power factor controller circuits, such as those described above, complete isolation between the primary and secondary sides of the transformer has been sacrificed to provide a feedback to the power factor controller or, for example, to establish a common ground path for the circuit. This, however, increases the potential risk associated with inadvertent application of the unregulated DC voltage to the load. In addition, when such configurations are used with conventional phase-control dimming circuits, the transient response time associated with the power controller circuit may not be sufficient to establish acceptable dimming of the lamp without perceptible flicker.

Consistent with the present disclosure, therefore, there is provided an LED ballast circuit and system that converts AC input such as a 120V/60 Hz input into a current source for an LED-based light source. The circuit includes complete transformer isolation and may use a single integrated circuit power factor controller to produce a pulsating DC output current that is amplitude modulated by the power factor controller at, for example, 120 Hertz. The resulting input power factor may be set very close to unity. The total harmonic distortion at the input may be very low, and any conducted EMI may be mitigated by the variable frequency switching technique. Additionally, the size of the transformer may be relatively small because of the high frequency operation and the switching topology, and the controller bias network and feedback configuration may eliminate the need for large electrolytic capacitors, or multiple capacitors, for dimming applications. The circuit may thus provide a very high power factor, high efficiency and small size that will work with dimmer switches, such as a reverse phase FET dimmer, without flicker at small conduction angles.

In an embodiment there is provided a ballast circuit to drive a light emitting diode (LED)-based light source. The ballast circuit includes a rectifier circuit configured to receive an AC input voltage and provide an unregulated DC voltage, and a transformer. The transformer has a primary winding coupled to the rectifier circuit, at least one secondary winding configured to be coupled to the LED-based light source, and a feedback winding, the secondary winding being electrically isolated from the primary winding and the feedback winding with no electrical path between the primary winding and the secondary winding or the feedback winding and the secondary winding. The ballast circuit also includes a switch, the switch being configured to close to couple a portion of the unregulated DC voltage across the primary winding and the switch being configured to open to transfer energy from the primary winding to the secondary winding to provide a DC output voltage to drive the LED-based light source. The ballast circuit also includes a power factor correction circuit configured to control the switch in response to a first signal representative of current through the primary winding, a second signal representative of current through the feedback winding, and a third signal representative of the unregulated DC voltage, with no feedback signal coupled from the secondary winding to the controller.

In a related embodiment, the ballast circuit may further include a switched bias circuit, the switched bias circuit including a bias circuit switch configured to close when the switch is open to provide a supply voltage to the power factor correction circuit. In a further related embodiment, the switched bias circuit may be coupled to the feedback winding, and the bias circuit switch may be configured to close in response to current through the feedback winding.

In another related embodiment, the ballast circuit may further include an over-voltage protection circuit coupled to the power factor correction circuit to disable the power factor controller circuit when a voltage at the transformer exceeds a predetermined level. In a further related embodiment, the over-voltage protection circuit may include a Zener diode coupled to the feedback winding, whereby a breakdown voltage of the Zener diode is exceeded when the voltage at the transformer exceeds the predetermined level thereby disabling the power factor controller circuit. In another further related embodiment, the over-voltage protection circuit may include an over-voltage protection switch configured to close when the voltage at the transformer exceeds the predetermined level thereby disabling the power factor controller circuit.

In still another related embodiment, the power factor correction circuit may include an integrated circuit power factor controller configured to receive the first signal, the second signal, and the third signal and to provide an output to control the switch. In yet another related embodiment, the AC input signal may be a 120V AC signal.

In another embodiment, there is provided an LED-based lamp assembly. The LED-based lamp assembly includes a lamp housing, a light source disposed within the lamp housing, and a ballast disposed within the lamp housing. The ballast includes: a rectifier circuit configured to receive an AC input voltage and provide an unregulated DC voltage; a transformer having a primary winding coupled to the rectifier circuit, at least one secondary winding coupled to the LED-based light source, and a feedback winding, the secondary winding being electrically isolated from the primary winding and the feedback winding with no electrical path between the primary winding and the secondary winding or the feedback winding and the secondary winding; a switch, the switch being configured to close to couple a portion of the unregulated DC voltage across the primary winding and the switch being configured to open to transfer energy from the primary winding to the secondary winding to provide a DC output voltage to drive the LED-based light source; and a power factor correction circuit configured to control the switch in response to a first signal representative of current through the primary winding, a second signal representative of current through the feedback winding and a third signal representative of the unregulated DC voltage, with no feedback signal coupled from the secondary winding to the controller.

In yet another embodiment, there is provided a method of driving an LED-based light source. The method includes: receiving an AC input signal, and converting the AC input signal into a regulated DC output using a ballast circuit. The ballast circuit includes: a transformer having a primary winding, a secondary winding and a feedback winding, the secondary winding being electrically isolated from the primary winding and the feedback winding with no electrical path between the primary winding and the secondary winding or the feedback winding and the secondary winding, and a power factor correction circuit receiving no feedback signal coupled from the secondary winding. The method also includes coupling the regulated DC output to the LED-based light source.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Figure 1:
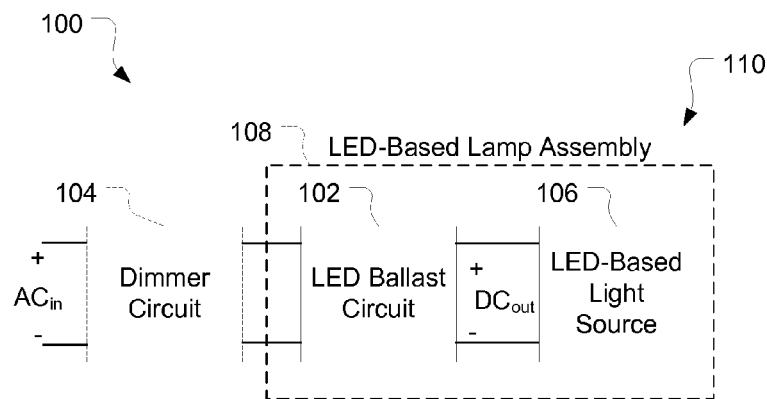
FIG. 1 shows a block diagram of a system including an optional dimmer circuit and an LED-based lamp assembly according to embodiments disclosed herein.

FIG. 1 is a simplified block diagram of one exemplary embodiment of a system 100 consistent with the present disclosure. In general, the system includes a light emitting diode (LED) ballast circuit 102 consistent with the present disclosure for receiving an alternating current (AC) input $AC_{in}$, either directly or through a known dimmer circuit 104, and providing a regulated direct current (DC) output $DC_{out}$ for driving an LED-based light source 106. The LED-based light source 106 may be a single LED or multiple LEDs interconnected in series and/or parallel configurations. In one embodiment, $AC_{in}$ may be provided directly from a 120 VAC/60 Hz line source. It is to be understood, however, that a system consistent with the present application may operate from AC sources, such as a 220-240 VAC at 50-60 Hz. In an embodiment including a dimmer circuit 104, the dimmer circuit may be any known dimmer circuit configuration, such as a reverse phase control dimmer circuit. The configuration and operation of such dimmer circuits are well-known in the art.

The LED ballast circuit 102 may convert the AC input voltage $AC_{in}$ to a regulated DC output voltage $DC_{out}$ with a high power factor, high efficiency, small size and protective isolation. The LED ballast circuit 102 and the LED-based light source 106 may thus be provided within a single lamp housing 108, such as within the housing of a parabolic aluminized reflector (PAR) lamp, to provide a LED-based lamp assembly 110 consistent with the present disclosure. The LED-based lamp assembly 110 provides a convenient retrofit for existing lighting fixtures configured to energize PAR lamps including non-LED based light sources, e.g. fluorescent or gas-discharge sources. An LED-based lamp assembly 110 consistent with the present disclosure may be inserted directly into such a lighting fixture to operate on the AC input thereto, and may operate with a known dimmer circuit. A lamp including an LED-based light source 106 may provide long life and low power consumption compared to those including non-LED-based light sources.

Figure 2:
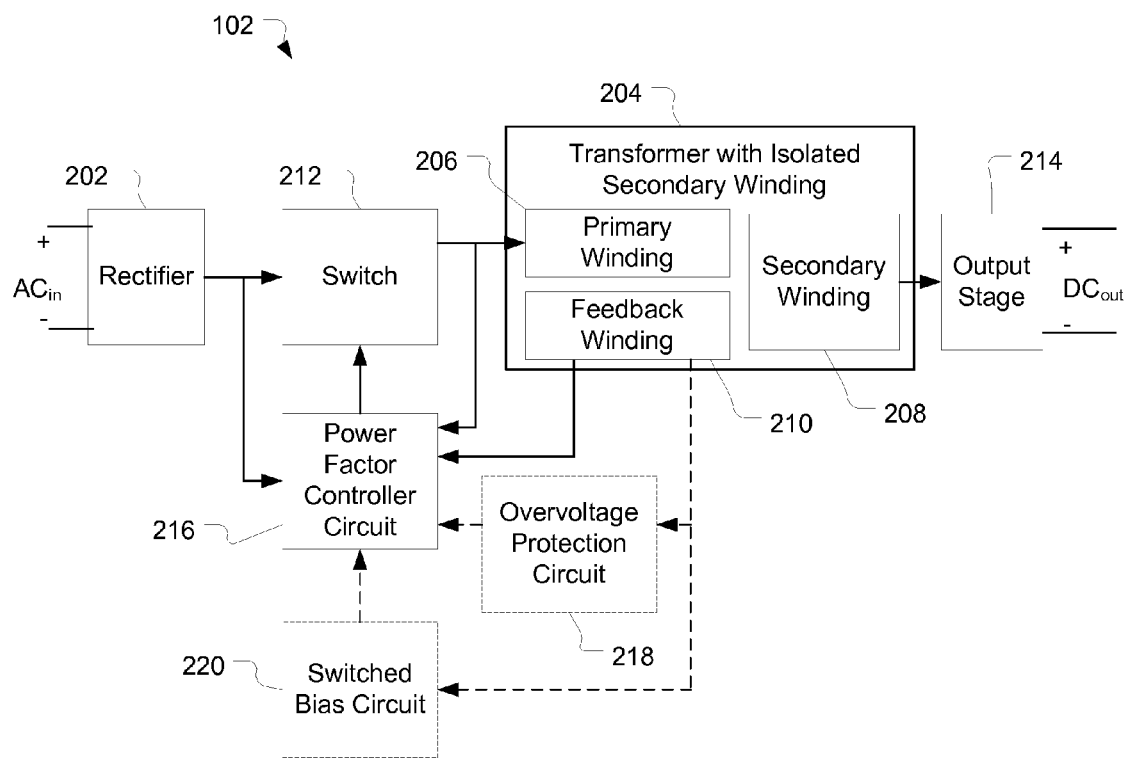
FIG. 2 illustrates a block diagram of an LED ballast circuit according to embodiments disclosed herein.

FIG. 2 is a block diagram that conceptually illustrates the functionality of an LED ballast circuit 102 consistent with the present disclosure. As shown, an LED ballast circuit 102 consistent with the present disclosure may include a rectifier 202, a transformer 204 including a primary winding 206, secondary winding 208 and a feedback winding 210, a switch 212 for coupling the output of the rectifier 202 to the primary winding 206 of the transformer 204, an output stage 214 coupled to a secondary winding 208 of the transformer, and a power factor controller circuit 216. The ballast circuit may also include an over-voltage protection circuit 218 and/or a switched bias circuit 220. The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals.

In general, the AC input voltage $AC_{in}$ may be coupled to the rectifier circuit 202, either directly or through a dimmer circuit 104. The rectifier circuit 202 may be configured to rectify $AC_{in}$ to provide an unregulated DC output voltage, i.e. a DC output voltage that follows instantaneous variations in the AC input voltage. A variety of rectifier circuit configurations are well-known in the art. In one embodiment, for example, the rectifier circuit 202 may include a known bridge rectifier.

The output of the rectifier 202 may be coupled to the primary winding 206 of the transformer through the switch 212 under the control of the power factor controller circuit 216. The switch 212 may be a known transistor switch, as is commonly used in known switching regulator configurations. In general, when the switch 212 is "closed", the primary winding 206 of the transformer 204 is coupled to the output of the rectifier 202 and the energy is stored in transformer windings. When the switch is "open", the energy stored in the secondary winding 208 is coupled to the output stage 214. The output stage 214 may include a capacitor that is charged by the energy from the secondary winding 208 and discharges through the LED-based light source 106 to drive the light source.

The power factor controller circuit 216 may include a known power factor controller (not shown) configured to provide an output to the switch 212 for controlling the switch 212 in response to a signal representative of current through the primary winding 206, a second signal representative of current through the feedback winding 210, and a third signal representative of the unregulated DC voltage, with no feedback signal coupled from the secondary winding 208 to the controller. The output from the power controller may control the switch so that the current to the LED-based light source 106 has a waveform that substantially matches and is in phase with the output of the rectifier 202, thereby providing high power factor.

Known power factor controllers useful in an LED ballast configuration consistent with the present disclosure include known integrated circuit power factor correction controllers, such as model number L6561 and L6562 controllers presently available from ST Microelectronics of Sunnyvale, Calif. The L6561 and L6563 controllers may, for example, be employed as a controller in a "flyback" DC-DC converter implementation. Details of this and related alternative applications of the L6561 controller are discussed in ST Microelectronics Application Note AN1060, "Flyback Converters with the L6561 PFC Controller," by C. Adragna and G. Garravarik, January 2003, and ST Microelectronics Application Note AN1059, "Design Equations of High-Power-Factor Flyback Converters based on the L6561," by Claudio Adragna, September 2003, each of which is available at http://www.st-.com and incorporated herein by reference. Specifically, Application Notes AN1059 and AN1060 discuss one exemplary configuration for an L6561-based flyback converter (High-PF flyback configuration) that operates in transition mode and exploits the ability of the L6561 controller to perform power factor correction, thereby providing a high power factor single switching stage DC-DC converter. Differences between the L6561 and L6562 controllers are discussed in ST Microelectronics Application Note AN1757, "Switching from the L6561 to the L6562," by Luca Salati, April 2004, also available at http://www.st.com and incorporated herein by reference. For purposes of the present disclosure, these two controllers may be discussed as having similar functionality.

In a ballast 102 consistent with the present disclosure, the secondary winding 208 of the transformer is not electrically coupled in any way to the primary 206 or feedback winding 210, e.g. there is no common ground electrical path for the windings and there is no feedback path coupled from the secondary winding 208 to the power factor controller circuit 216 or any other element on primary winding side of the ballast. The power factor controller operates using signals coupled thereto from the output of the rectifier 202, and the primary 206 and feedback windings 210, but no feedback signal is coupled, e.g. electrically or optically, from the secondary winding 208 to the controller. This provides complete protective isolation for the high voltages on the primary winding side of the transformer and the secondary side of the transformer. In addition, by not requiring feedback from the secondary winding 208, the overall size and complexity of the ballast is reduced compared to configurations wherein, for example, optically isolated feedback is provided from the secondary winding 208 to the controller.

As is known, the supply voltage for operating a power factor controller may be self-supplied in the ballast configuration to ensure a regulated, stable supply to the circuit during operation. In a ballast configuration consistent with the present disclosure including the optional switched bias circuit 220, the switched bias circuit 220 may establish a supply voltage to the controller with low transient response time and low power dissipation. In the illustrated embodiment, the switched bias circuit 220 is coupled between the feedback winding 210 and the power factor correction circuit 216. In an embodiment including a L6561 or L6562 power controller, for example, the switched bias circuit may be coupled to the Vcc input of the power factor controller and may include a transistor switch that turns on when the switch 212 is opened to use energy transferred from the feedback winding 210 for providing a voltage supply to the power factor controller. Such a configuration provides rapid transient response that may be particularly useful when the system is implemented with a dimmer circuit 104, such as a phased controlled dimmer circuit.

The optional over-voltage protection circuit 218 may be provided to shut down or prohibit operation of the power factor controller circuit 216 upon the occurrence of an over-voltage condition. For example, if the LED-based load 106 ceases conducting current from the secondary winding 208, e.g. if the load is not connected or malfunctions, a dangerous over-voltage condition on the terminals of the transformer 204 may arise. In the illustrated embodiment, the over-voltage protection circuit 218 is coupled between the feedback winding 210 and the power factor correction circuit 216. In an embodiment including a L6561 or L6562 power controller for example, the over-voltage protection circuit 218 may be coupled to the INV or ZCD input of the power factor controller for shutting the controller down if an over-voltage condition exists.

The optional switched bias circuit 220 and over-voltage protection circuit 218 are described herein as being useful in connection with a ballast wherein the secondary winding is completely isolated from the primary and feedback windings and no feedback is coupled from the secondary winding to the power factor controller. Those of ordinary skill in the art will recognize, however, that these circuits 218, 220 may be provided in a wide variety of ballast configurations. For example, these circuits may be included in a ballast configuration including different transformer or feedback configuration.

Figure 3:
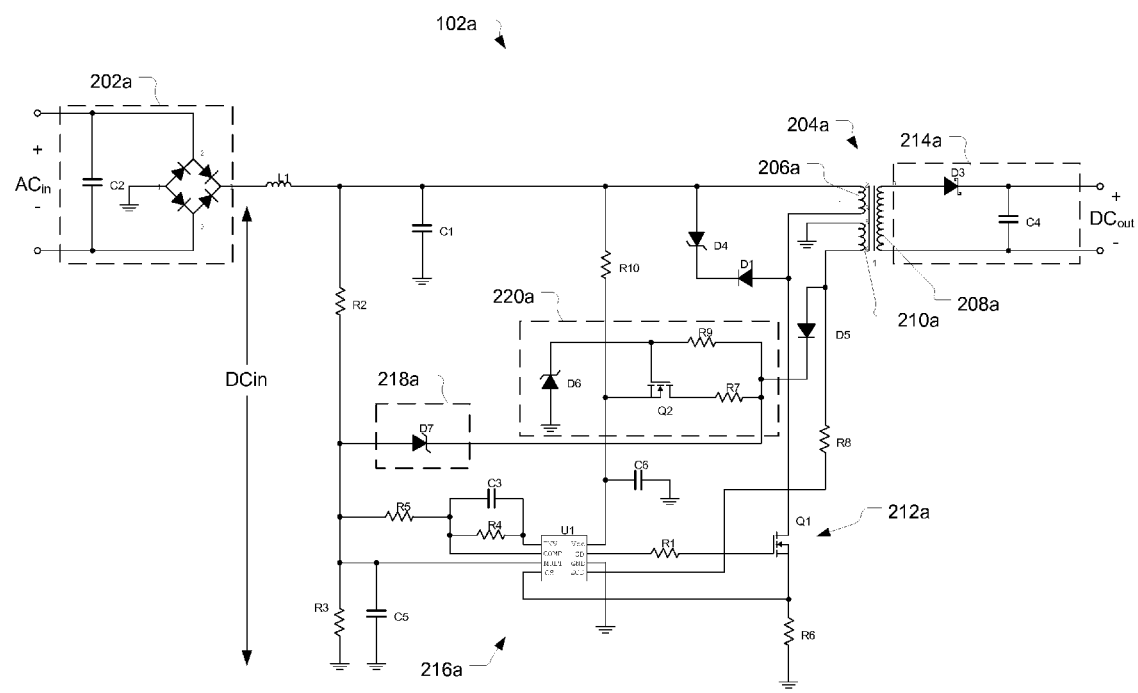
FIG. 3 is a circuit diagram of an LED ballast circuit according to embodiments disclosed herein.

FIG. 3 is a schematic diagram illustrating one exemplary embodiment of an LED ballast circuit 102a consistent with the present disclosure. The illustrated exemplary embodiment includes a rectifier circuit 202a, a transformer 204a including a primary winding 206a, a secondary winding 208a and a feedback winding 210a, a switch Q2 (212a) for coupling the output of the rectifier circuit 202a to the primary winding 206a of the transformer 204a, an output stage 214a coupled to a secondary winding 208a of the transformer 204a, a power factor controller circuit 216a, an over-voltage protection circuit 218a, and a switched bias circuit 220a. The power factor controller circuit 216a includes an L6561 integrated circuit power factor controller U1, the operation of which is known and described in ST Microelectronics Application Notes AN1060 and AN1059, referred to above. Those of ordinary skill in the art will recognize, however, that other known power factor controllers may be used in place of the L6561 controller shown in FIG. 3.

In operation, the AC input to the circuit $AC_{in}$ is coupled to the rectifier circuit 202a, which includes a known bridge rectifier. The rectifier full-wave rectifies the AC input to provide a rectified unregulated DC voltage $DC_{in}$. The output of the rectifier $DC_{in}$ is connected to L1 and C1, which filter noise generated in the circuit.

The primary winding 206a of the transformer 204a is coupled between the output of the rectifier circuit 202a and the drain of Q1 so that when Q1 is conducting, i.e. the switch is closed, current flows from the output of the rectifier circuit 202a through the primary winding 206a to energize the primary winding 206a, but when Q1 is not conducting, i.e. the switch is open, essentially no current flows through the primary winding 206a. In general, when the switch Q1 is closed, the windings of the transformer 204a are energized, and when the switch Q1 opens, the polarity of the voltage across the secondary winding 208a and the feedback winding 210a reverses to forward bias diodes D3 and D5. When diode D3 is forward biased, energy from the secondary winding 208a charges capacitor C4, which is configured to discharge through the load when the switch Q1 is open.

In general, the power factor controller U1 uses a voltage representative of the output of the rectifier circuit 202a (i.e., $DC_{in}$) as a reference to control the level at which the controller U1 switches the switch Q1 on and off using a gate drive GD output coupled to the gate of Q1 through R1. This feature allows for a very high power factor ballast. The switching frequency is determined by feedback from the primary winding 206a and the feedback winding 210a.

In particular, a portion of $DC_{in}$ is coupled to the multiplier input MULT of the controller U1 to provide a signal to the controller U1 representative of the unregulated DC voltage $DC_{in}$. The MULT input is coupled between R2 and the parallel combination of R3 and C5. Selection of R3 and C5 allows for a tradeoff between ripple and power factor correction in the output voltage $DC_{out}$ established by the controller U1. The source of Q1 is coupled to the current sense CS input of the controller U1 and to ground through R6. The current through R6 thus provides a signal to the controller U1 representative of the current through the primary winding 206a. The feedback winding 210a of the transformer 204a is coupled through R8 to the zero current detection input ZCD of the controller U1 to provide a signal to the controller U1 representative of the current through the feedback winding 210a. In response to the MULT, ZCD and CS inputs, the controller U1 provides a variable frequency gate drive GD output to Q1 for driving the load with a high power factor.

Bias voltage is supplied to the power controller supply voltage input Vcc through R10, which is coupled to Vcc through the switched bias circuit 220a. When there is no starting pulse at the gate of Q1, no current is provided from the rectifier output to energize the transformer windings 206a, 208a, 210a. Once the voltage on Vcc reaches its minimum value, the gate drive output GD of the controller U1 provides a starting pulse to the gate of Q1 through R1 to close the switch Q1 so that at least a portion of the rectifier output is provided across the primary winding 206a to energize the transformer windings 206a, 208a, 210a.

The drain current in Q1 begins to ramp up at a rate determined by the primary inductances of the transformer 204a. This current produces a voltage across R6, which is representative of the current through the primary winding 206a. This current is fed into the current sense CS input of the controller U1. The controller U1 compares this voltage to the voltage on the multiplier input MULT and the voltage on inverting input INV, which is set by R2, R3, and the parallel combination of R4 and C3 coupled in series with R5. When the voltage conditions are met according to the switching characteristics set by the controller U1, the drive to Q1 is removed. This causes the voltage across the primary winding 206a and the secondary winding 208a of the transformer 204a to reverse. The energy stored in the transformer 204a is then transferred to the output via D3. During this same time interval, the transformer 204a provides a voltage on the feedback winding 210a that forward biases D5 to provide current to the switched bias circuit 220a.

In the illustrated embodiment, the switched bias circuit 220a includes bias circuit switch Q2, R7, R9, and Zener diode D6. R9 and D6 are coupled to the gate of Q2, R7 is coupled to the source of Q2, and the drain of Q2 is coupled to R10, C6, and the Vcc input of the controller U1. D5 is coupled to R9 and R7. When D5 is forward biased, a current is established through R9 that turns Q2 on once the gate signal reaches the threshold voltage of Q2. Q2 charges C6, which provides supply voltage to the Vcc input. Q2 switches on quickly to provide supply voltage to Vcc with low power dissipation. After all the energy is removed from the transformer, the voltage on the feedback winding drops to zero. This negative transition on the zero current detection input ZCD of the controller U1 instructs it to start a new cycle. After several cycles, the bias voltage on Vcc reaches its normal operating level determined by the Zener diode D6.

The over-voltage protection circuit 218a in the illustrated embodiment includes Zener diode D7. When D5 is forward biased by the feedback winding 210a, if the voltage across the feedback winding 210a exceeds a predetermined acceptable level, the breakdown voltage of D7 is exceeded and voltages are established at the inverting input INV and COMP input by R5, R4, and C3 that will shut down the controller U1 to open Q1. The over-voltage protection circuit 218a thus disables the current supply to the transformer 204a to provide protection against dangerous voltages occurring in the circuit due, for example, to disconnection or malfunction of the load.

Figure 4:
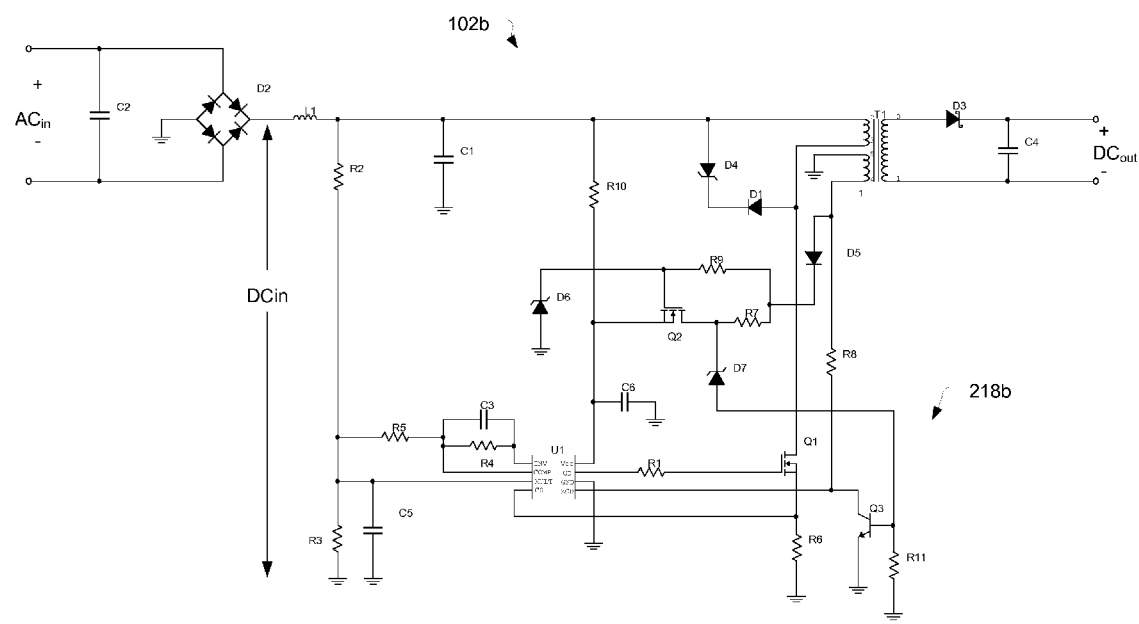
FIG. 4 is a circuit diagram of another LED ballast circuit according to embodiments disclosed herein.

FIG. 4 is a schematic diagram illustrating another exemplary embodiment 102b of an LED ballast circuit consistent with the present disclosure. The embodiment illustrated in FIG. 4 is configured and operates in essentially the same manner as described above with respect to FIG. 3, with the main differences being in the configuration and operation of the over-voltage protection circuit, and a further difference being that the controller in FIG. 4 is a L6562 controller.

The over-voltage protection circuit 218b in FIG. 4 includes Zener diode D7, R5, over-voltage protection circuit switch Q3 and R11. The collector of Q3 is coupled to the zero current detection input ZCD of the controller. When D5 is forward biased by the feedback winding, if the voltage across the feedback winding exceeds a predetermined acceptable level, the breakdown voltage of D7 is exceeded and a voltage is established across R11 at the base of Q3 that turns Q3 on. When Q3 is on a current is established through R8 to provide a voltage at the ZCD input that will shut down the controller to open Q1. The over-voltage protection circuit 218b thus disables the current supply to the transformer to provide protection against dangerous voltages occurring in the circuit due, for example, to disconnection or malfunction of the load.

A ballast circuit consistent with the present disclosure may be configured for operation with a variety of input voltages based on appropriate selection of various circuit components thereof. Table 1 below identifies one example of circuit components useful in configuring the embodiment illustrated in FIG. 4 for operation with a 120V RMs/60 Hz AC input signal (resistor values in ohms):

| Component | Descriptor/Value |
| --- | --- |
| ACin | 120 V AC/60 Hz |
| C1 | 200 nf |
| C2 | 200 nF |
| C3 | 1 nF |
| C4 | 10 uf |
| C5 | 1 nF |
| C6 | 10 uF |
| D1 | 1 A |
| D3 | 1 A |
| D4 | 220 V |
| D5 | BAS16 |
| D6 | 15 V |
| D7 | 35 V |
| Dout | 27 V DC |
| L1 | 222 uH |
| Q1 | TK4P60 |
| Q2 | BSS131 |
| Q3 | 2N2222 |
| R1 | 10 |
| R2 | 1M |
| R3 | 6.8k |
| R4 | 180k |
| R5 | 98.9k |
| R6 | 2 |
| R7 | 10 |
| R8 | 47k |
| R9 | 100k |
| R10 | 110k |
| R11 | 5K |
| T1 | 22 mm EI core LP = 1.5 mH |

Figure 5:
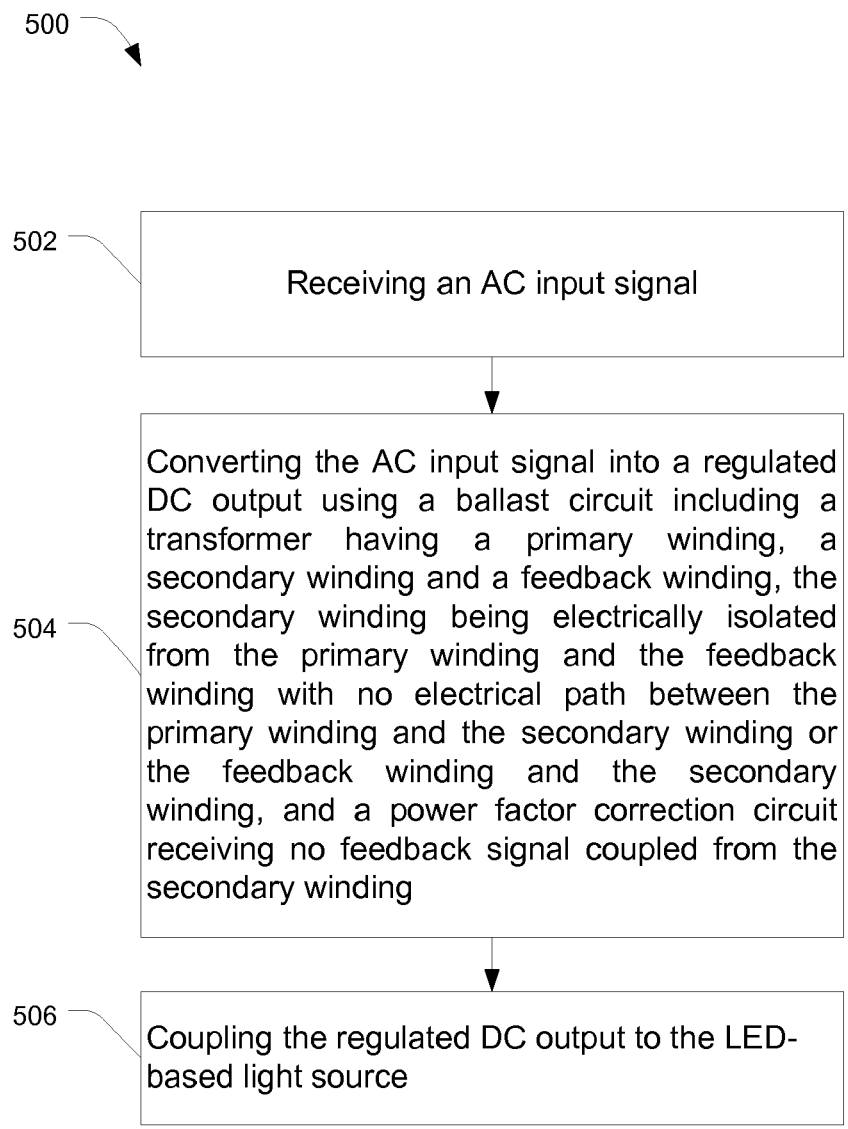
FIG. 5 is a flow diagram of a method according to embodiments disclosed herein.

FIG. 5 is a block flow diagram of a method 500 for driving an LED-based light source consistent with the present disclosure. The illustrated block flow diagram may be shown and described as including a particular sequence of steps. It is to be understood, however, that the sequence of steps merely provides an example of how the general functionality described herein may be implemented. The steps do not have to be executed in the order presented unless otherwise indicated.

In the exemplary embodiment illustrated in FIG. 5, an AC input signal is received 502. The AC input signal is converted 504 into a regulated DC output using a ballast circuit including a transformer having a primary winding, a secondary winding and a feedback winding, the secondary winding being electrically isolated from the primary winding and the feedback winding with no electrical path between the primary winding and the secondary winding or the feedback winding and the secondary winding, and a power factor correction circuit receiving no feedback signal coupled from the secondary winding. The DC output is coupled 506 to the LED-based light source to drive the light source.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one, of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A ballast circuit to drive a light emitting diode (LED)-based light source, the ballast circuit comprising:
   a rectifier circuit configured to receive an AC input voltage and provide an unregulated DC voltage;
   a transformer having a primary winding coupled to the rectifier circuit, at least one secondary winding configured to be coupled to the LED-based light source, and a feedback winding, the secondary winding being electrically isolated from the primary winding and the feedback winding with no electrical path between the primary winding and the secondary winding or the feedback winding and the secondary winding;
   a switch, the switch being configured to close to couple a portion of the unregulated DC voltage across the primary winding and the switch being configured to open to transfer energy from the primary winding to the secondary winding to provide a DC output voltage to drive the LED-based light source; and
   a power factor correction circuit configured to control the switch in response to a first signal representative of current through the primary winding, a second signal representative of current through the feedback winding, and a third signal representative of the unregulated DC voltage, with no feedback signal coupled from the secondary winding to the power factor correction circuit.

2. A ballast circuit according to claim 1, the ballast circuit further comprising a switched bias circuit, the switched bias circuit comprising a bias circuit switch configured to close when the switch is open to provide a supply voltage to the power factor correction circuit.

3. A ballast circuit according to claim 2, wherein the switched bias circuit is coupled to the feedback winding, and wherein the bias circuit switch is configured to close in response to current through the feedback winding.

4. A ballast circuit according to claim 1, the ballast circuit further comprising an over-voltage protection circuit coupled to the power factor correction circuit to disable the power factor correction circuit when a voltage at the transformer exceeds a predetermined level.

5. A ballast circuit according to claim 4, wherein the over-voltage protection circuit comprises a Zener diode coupled to the feedback winding, whereby a breakdown voltage of the Zener diode is exceeded when the voltage at the transformer exceeds the predetermined level thereby disabling the power factor correction circuit.

6. A ballast circuit according to claim 4, wherein the over-voltage protection circuit comprises an over-voltage protection switch configured to close when the voltage at the transformer exceeds the predetermined level thereby disabling the power factor correction circuit.

7. A ballast circuit according to claim 1, wherein the power factor correction circuit comprises an integrated circuit power factor controller configured to receive the first signal, the second signal, and the third signal and to provide an output to control the switch.

8. A ballast circuit according to claim 1, wherein the AC input signal is a 120V AC signal.

9. An LED-based lamp assembly comprising:
a lamp housing;
a light source disposed within the lamp housing; and
a ballast disposed within the lamp housing, the ballast comprising:
   a rectifier circuit configured to receive an AC input voltage and provide an unregulated DC voltage;
   a transformer having a primary winding coupled to the rectifier circuit, at least one secondary winding coupled to the LED-based light source, and a feedback winding, the secondary winding being electrically isolated from the primary winding and the feedback winding with no electrical path between the primary winding and the secondary winding or the feedback winding and the secondary winding;
   a switch, the switch being configured to close to couple a portion of the unregulated DC voltage across the primary winding and the switch being configured to open to transfer energy from the primary winding to the secondary winding to provide a DC output voltage to drive the LED-based light source; and
   a power factor correction circuit configured to control the switch in response to a first signal representative of current through the primary winding, a second signal representative of current through the feedback winding and a third signal representative of the unregulated DC voltage, with no feedback signal coupled from the secondary winding to the power factor correction circuit.

10. An LED-based lamp assembly according to claim 9, the ballast circuit further comprising a switched bias circuit, the switched bias circuit comprising a bias circuit switch configured to close when the switch is open to provide a supply voltage to the power factor correction circuit.

11. An LED-based lamp assembly according to claim 10, wherein the switched bias circuit is coupled to the feedback winding, and wherein the bias circuit switch is configured to close in response to current through the feedback winding.

12. An LED-based lamp assembly according to claim 9, the ballast circuit further comprising an over-voltage protection circuit coupled to the power factor correction circuit to disable the power factor correction circuit when a voltage at the transformer exceeds a predetermined level.

13. An LED-based lamp assembly according to claim 12, wherein the over-voltage protection circuit comprises a Zener diode coupled to the feedback winding, whereby a breakdown voltage of the Zener diode is exceeded when the voltage at the transformer exceeds the predetermined level thereby disabling the power factor correction circuit.

14. An LED-based lamp assembly according to claim 12, wherein the over-voltage protection circuit comprises an over-voltage protection switch configured to close when the voltage at the transformer exceeds the predetermined level thereby disabling the power factor correction circuit.

15. An LED-based lamp assembly according to claim 9, wherein the power factor correction circuit comprises an integrated circuit power factor controller configured to receive the first signal, the second signal, and the third signal and to provide an output for controlling the switch.

16. An LED-based lamp assembly according to claim 9, wherein the AC input signal is a 120V AC signal.

* * * * *